United States Patent Office 3,422,114
Patented Jan. 14, 1969

3,422,114
BASIC ETHERS OF DIHYDRONAPHTHYL-
PHENOLS
Charles Ferdinand Huebner, Chatham, and William
Laszlo Bencze, New Providence, N.J., assignors to
Ciba Corporation, New York, N.Y., a corporation
of Delaware
No Drawing. Continuation-in-part of application Ser. No.
232,889, Oct. 24, 1962. This application Sept. 21, 1965,
Ser. No. 489,042
U.S. Cl. 260—296                                      5 Claims
Int. Cl. C07c 93/14; C07d 31/42; C07d 49/14

ABSTRACT OF THE DISCLOSURE
Compounds of the formula

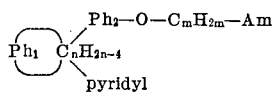

$Ph_1$=a 1,2-phenylene
$Ph_2$=a phenylene
$n$=4–7
$m$=2–7
Am=an amino group and salts thereof exhibit estrogenic and antifertility effects.

Cross-references to related applications

This is a continuation-in-part of application Ser. No. 232,889 filed Oct. 24, 1962, now abandoned which in turn is a continuation-in-part of application Ser. No. 160,291 filed Dec. 18, 1961, now abandoned.

The present invention concerns and has for its object the provision of dihydro-naphthalene and benzosuberene compounds of the Formula I:

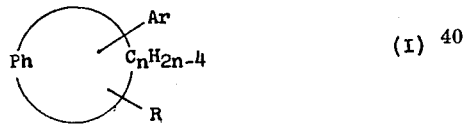

in which Ph stands for a 1,2-phenylene radical, Ar for a monocyclic carbocyclic aryl radical substituted by at least one amino-lower alkoxy group in which the nitrogen atom is separated from the oxygen atom by at least two carbon atoms, R for a carbocyclic or heterocyclic aryl radical and the portion —$C_nH_{2n-4}$— for lower alkenylene forming with Ph a six- or seven membered ring, two of the ring carbon atoms thereof carry the Ar- and R-radicals, with the provision that in the corresponding 1-Ar.-3,4-dihydro-naphthalene compounds, in which Ar. represents a (di-alkylamino-, alkyleneimino-, mono- aza- or oxaalkylene-imino)-alkoxyphenyl radical, the monocyclic carbocyclic aryl radical R contains at least one nitro, amino or amino-lower alkoxy group or is separated from the Ar.-radical by at least three ring-carbon atoms, N-oxides, quaternaries and salts of these compounds, as well as methods for their preparation.

The 1,2-phenylene (o-phenylene)radical Ph is unsubstituted or may be substituted by one or more than one of the same or of different substituents attached to any of the four positions available for substitution. Such substituents are primarily the following: lower alkyl, e.g. methyl, ethyl, n- or i-propyl, etherified hydroxy, especially lower alkoxy, e.g. methoxy, ethoxy, n- or i-propoxy or n-butoxy, lower alkenyloxy, e.g. allyloxy lower alkylenedioxy, e.g. methylenedioxy, esterified hydroxy, particularly halogeno, e.g. fluoro, chloro or bromo, trifluromethyl, nitro, unsubstituted or substituted amino, such as di-lower alkyl-amino, e.g. dimethylamino or diethylamino, acyl, such as lower alkanoyl, e.g. acetyl, propionyl or pivalyl, benzoyl or pyridoyl, e.g. nicotinoyl. Above all the 1,2-phenylene radical Ph stands for 1,2-phenylene, (lower alkyl)-1,2-phenylene, (lower alkoxy)-1,2-phenylene, (lower alkenyloxy)-1,2-phenylene, (lower alkylenedioxy)-1,2-phenylene, (halogeno)-1,2-phenylene, (trifluoromethyl)-1,2-phenylene, (nitro)-1,2-phenylene, (amino)-1,2-phenylene, (di-lower alkylamino)-1,2-phenylene, (lower alkanoyl)-1,2-phenylene, (benzoyl)-1,2-phenylene or (pyridoyl)-1,2-phenylene.

The lower alkenylene group —$C_nH_{2n-4}$— substituting the two adjacent positions 1 and 2 of the phenylene radical Ph may be unbranched or branched and has preferably from four to seven carbon atoms, four or five of which form the ring chain which carries the aryl radicals Ar and R. Accordingly, the letter $n$ in the above group stands preferably for one of the integers 4, 5, 6 and 7, but especially for the integer 4 or 5. Above all two adjacent ring-carbon atoms of the group —$C_nH_{2n-4}$— carry the radicals Ar and R. Said alkenylene group represents, for example, 1,4-but-1 or 2-enylene, 2-methyl- or 2,3-dimethyl-1,4-but-2-enylene, 1,4- or 1,5-pent-1,2- or 3-enylene, 2-methyl-1,4-pent-1 or 2-enylene, 2,4-hex-2 or 3-enylene, 1,5-hex-1,2- or 3-enylene, 3-methyl-1,4-hex-1 or 2-enylene, 1,4- or 1,5-hept-1 or 2-enylene or 2,5-hept-3-enylene.

The monocyclic aryl radical Ar contains one or more than one amino-lower alkoxy substituent, which may substitute any of the positions available for substitution. It is preferably a monocyclic carbocyclic aryl radical which, beside the amino-lower alkoxy substituent(s), may contain one or more than one additional substituents, which may be attached to any of the positions available for substitution. Such substituents are represented by lower alkyl, e.g. methyl, ethyl or i-propyl, halogeno, e.g. fluoro, chloro or bromo or trifluoromethyl. An amino-lower alkoxy group may be represented by the formula Am—($C_mH_{2m}$)—O— in which the letter $m$ is preferably an integer from two to seven, more especially an integer from two to three. The portion —($C_mH_{2m}$)— above all stands for 1,2-ethylene, but also for 1,2-, 2,3- or 1,3-propylene, 1,3-, 2,3-, 3,4- or 1,4-butylene, 1,4- or 1,5-pentylene, 1,5- or 1,6-hexylene or 1,7-heptylene.

In the above formula the amino group Am stands for a primary, secondary or preferably a tertiary amino group. Substituents in the secondary or tertiary amino group are, for example, aliphatic radicals, such as lower alkyl or lower alkenyl, e.g. methyl, ethyl, n- or i-propyl, n- or i-butyl, sec. butyl, pentyl, or neopentyl; allyl or methallyl; cycloaliphatic radicals, such as cycloalkyl, or cycloaliphatic-aliphatic radicals, such as cycloalkyl-lower alkyl, especially those having from three to seven, preferably from five to six, ring carbon atoms, e.g. cyclo-pentyl or cyclo-hexyl; cyclopentylmethyl or 2-cyclohexylethyl; carbocyclic aryl radicals, such as monocyclic carbocyclic aryl, e.g. phenyl or carbocyclic aryl-aliphatic radicals, such as monocyclic carbocyclic aryl lower alkyl, e.g. benzyl, 1- or 2-phenyl-ethyl.

Substituted amino groups Am are primarily mono- or di-lower alkylamino groups, in which lower alkyl has preferably from one to four carbon atoms, e.g. methylamino, dimethylamino, N-methyl-N-ethylamino, ethylamino, di-ethylamino, n-propylamino, di-n-propylamino, isopropyl-amino, di-isopropylamino, n-butylamino or di-n-butyl-amino, cycloalkylamino or N-cycloalkyl-N-lower alkyl-amino, in which cycloalkyl has preferably from five to six ring carbon atoms and lower alkyl has preferably from one to four carbon atoms, e.g. cyclopentylamino, cyclo-hexylamino, N-cyclopentyl-N-methyl-amino, N-cyclo-hexyl-N-methyl-amino or N-cyclohexyl-N-ethyl-amino, phenyl-lower alkyl-amino or N-lower alkyl-N-phenyllower alkyl-amino, in which lower alkyl has preferably from one to four carbon atoms, e.g. benzylamino, N-benzyl-N-methyl-amino, N-benzyl-N-ethyl-amino, N-ethyl-N-(1-phenylethyl)-amino or N-methyl-N-(2-phenylethyl)-amino. The above substituents, particularly lower alkyl, may also carry functional groups, such as hydroxy, lower alkoxy, e.g. methoxy or ethoxy or lower alkyl-mercapto, e.g. methylmercapto or ethylmercapto. Substituted amino groups, in which the substituents carry functional groups are, for example, hydroxy-lower alkyl-amino, N-(hydroxy-lower alkyl)-N-lower alkyl-amino or di-(hydroxy-lower alkyl)-amino, in which hydroxy is separated from the amino-nitrogen by at least two, preferably by two to three, carbon atoms, e.g. 2-hydroxy-ethyl-amino, N-(2-hydroxyethyl)-N-methyl-amino or di-(2-hydroxy-ethyl)-amino.

A tertiary amino group Am may also represent alkyleneimino, in which alkylene has from four to eight carbon atoms, such as pyrrolidino groups, e.g., pyrrolidino or 2-methyl-pyrrolidino, piperidino groups, e.g., piperidino, 2-methyl-piperidino, 4-methyl-piperidino, 3-hydroxy-piperidino, 3-acetoxy-piperidino or 3-hydroxymethyl-piperidino; 1,6 hexyleneimino or 1.7-heptyleneimino; aza-alkyleneimino groups or particularly N-lower alkylaza-alkylene-imino groups, in which alkylene has from four to six carbon atoms and the two nitrogen atoms are separated by at least two carbon atoms, such as piperazino or, particularly, 4-lower alkyl-piperazino, e.g. 4-methyl-piperazino or 4-ethyl-piperazino, as well as 4-hydroxyethyl-piperazino or 4-acetoxyethyl-piperazino, 3-aza-1,6-hexyleneimino, particularly 3-aza-3-lower alkyl-1,6-hexyleneimino, e.g. 3-aza-3-methyl-1,6-hexyleneimino, 4-aza-1,7-heptyleneimino, particularly 4-aza-4-lower alkyl-1,7-heptyleneimino, e.g. 4-aza-4-methyl-1,7-heptyleneimino, oxa-alkyleneimino or thia-alkyleneimino in which alkylene has preferably four carbon atoms, and the oxygen or sulfur atom is separated from the nitrogen atom by two carbon atoms, such as morpholino or thiamorpholino groups, e.g. morpholino, 3-methyl-morpholino or thiamorpholino.

In the amino-lower alkoxy group, the lower alkyl portion, either partially or in toto, may also form part of a heterocyclic ring system, of which the amino group is a ring member and is separated from the oxygen atom by at least two carbon atoms. Such amino-lower alkoxy groups are, for example, piperidyl-(2) or (3)-methoxy, piperidyl(4)-oxy, pyrrolidyl-(3)-oxy, 1-methylpiperidyl-(2) or (3)-methoxy, 1-ethyl-piperidyl-(4)-oxy, 1-methyl-pyrrolidyl(3)-oxy or imidazolinyl-(2)-methoxy.

The aryl group R in Formula I preferably is a carbocyclic aryl radical, particularly a monocyclic carbocyclic aryl radical, which may be unsubstituted or may contain one or more than one of the same or of different substituents attached to any of the positions available for substitution. Such substituents are primarily the following: lower alkyl, or lower alkoxy, preferably such with one to four carbon atoms, e.g. methyl, ethyl, n- or i-propyl or n-butyl; methoxy, ethoxy, n- or i-propoxy, or n-butoxy, halogeno, e.g. fluoro, chloro or bromo, trifluoromethyl, nitro, amino, di-lower alkyl-amino in which lower alkyl has preferably from one to four carbon atoms, e.g. dimethylamino, N-ethyl-N-methyl-amino, or diethylamino, or the group Am—(C$_m$H$_{2m}$)—O— with the previously-given meaning. The aryl radical representing R may also be a heterocyclic aryl radical, particularly a monocyclic heterocyclic aryl radical, such as pyridyl, e.g. 3- or 4-pyridyl.

Salts of the compounds of this invention are acid addition salts, especially pharmaceutically acceptable acid addition salts with inorganic acids, e.g. hydrochloric, hydrobromic, sulfuric or phosphoric acid or organic acids, such as carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic or isonicotinic acid, or sulfonic acids, e.g. methane sulfonic, ethane sulfonic, ethane 1,2-disulfonic, 2-hydroxyethane sulfonic, p-toluene sulfonic or napthalene 2-sulfonic acid. Other addition salts with acids may be useful as intermediates, for example, in the preparation of pharmaceutically acceptably, non-toxic acid addition salts or in the purification of the free compounds, as well as for identification or characterization purposes. Salts, which are prepared primarily for the latter, are, for example, those with acidic organic nitro compounds, e.g. picric, picrolonic or flavianic acid or metal complex acids, e.g. phosphotungstic, phosphomolybdic, chloroplatinic or Reinecke acid. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium compounds of this invention are those formed with the above compounds and reactive esters of alcohols and strong inorganic or organic acids, particularly those with lower aliphatic halides, sulfates, or sulfonates, such as lower alkyl halides, e.g. methyl, ethyl, n-propyl or isopropyl chloride, bromide or iodide, di-lower alkyl sulfates, e.g. dimethyl sulfate or diethyl sulfate, lower alkyl lower alkane sulfonates, e.g. ethyl or methyl methane sulfonate or ethane sulfonate, lower alkyl lower hydroxy-alkane sulfonates, e.g. methyl 2-hydroxy-ethane sulfonate, or lower alkyl monocyclic carbocyclic aryl sulfonates, e.g. methyl p-toluene sulfonate or ethyl p-toluene sulfonate, as well as those with carbocyclic aryl-aliphatic halides, such as phenyl-lower alkyl halides, e.g. benzyl, 1-phenylethyl or 2-phenylethyl chloride, bromide or iodide. Also included as quaternary ammonium compounds are the corresponding quaternary ammonium hydroxides and the quaternary ammonium salts with acids other than hydrohalic, sulfuric or organic sulfonic acids, particularly those with the carboxylic acids mentioned hereinabove.

The compounds of the invention have valuable pharmacological properties. They show primarily estrogenic and antifertility effects, as can be demonstrated in animal tests using, for example, mice and rats as test objects. The compounds of the invention are, therefore, useful in the control of fertility and in place of steroidal estrogens, for example, in the treatment of animals to increase weight gain and efficiency of feed utilization. Furthermore, they can be used as intermediates for the preparation of other useful products, particularly of pharmacologically active compounds, such as those described and claimed in U.S. Patent No. 3,277,106, issued Oct. 4, 1966.

Particularly useful are compounds of the Formula II

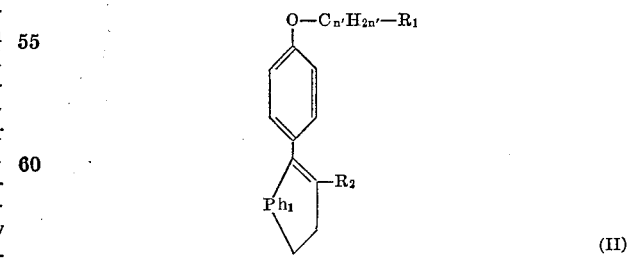

(II)

in which Ph$_1$ stands for 1,2-phenylene, (lower alkyl)-1,2-phenylene, (lower alkoxy)-1,2-phenylene, (halogeno)-1,2-phenylene, (trifluoromethyl)-1,2-phenylene, (nitro)-1,2-phenylene or (di-lower alkylamino)-1,2-phenylene, R$_1$ for di-lower-alkylamino, alkyleneimino with 4 to 7 carbon atoms, morpholino, N-lower alkylpiperazino, 2-imidazolinyl or 1-lower alkyl-2-imidazolinyl, n' for an integer from 1 to 3 whereby a nitrogen atom present in R$_1$ is separated from the oxygen atom on the 1-phenyl group by at least 2 carbon atoms and R$_2$ for phenyl, (lower alkyl)-phenyl, (lower alkoxy)-phenyl, (halogeno)-phenyl, (trifluoromethyl)-phenyl, (nitro)-phenyl, (di - lower - alkyl-amino)-phenyl, ($R_1$—$C_{n'}H_{2n'}$—O)—phenyl, pyridyl or (lower alkyl)-pyridyl, with the provision that in the compounds in which $R_1$ stands for di-lower-alkylamino, alkylenenimino, morpholino or N-lower alkylpiperazino $R_2$ stands for (nitro)-phenyl, (di-lower-alkylamino)-phenyl, ($R_1$—$C_{n'}H_{2n'}$—O)—phenyl, pyridyl or (lower alkyl)-pyridyl, and acid addition salts thereof.

Especially mentioned are the compounds of the Formula III

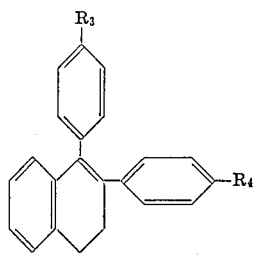

(III)

in which $R_3$ stands for 2-imidazolinyl-methoxy or 1-lower alkylimidazolinyl-methoxy and $R_4$ for hydrogen or both of $R_3$ and $R_4$ for diethylamino-ethoxy and acid addition salts thereof. Of these, for example, the first and last compound, when given subcutaneously to rats at a dose between about 20 μg and 2 mg./kg./day show an outstanding estrogenic response.

The compounds of the invention are prepared according to methods known per se. For example, the process comprises the method wherein (a) in a compound of the Formula IV

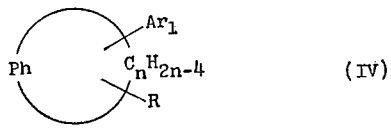

(IV)

in which $Ar_1$ is a monocyclic aryl group substituted by at least one group $R_0$ which is a substitutent capable of being converted into an amino-lower alkoxy group, in which the nitrogen atom is separated from the oxygen atom by at least two carbon atoms, or a salt thereof, the substituent $R_0$ is converted into said amino-lower alkoxy group or (b) a compound of the Formula V

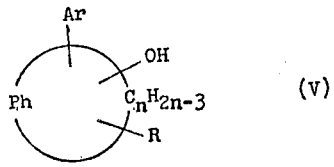

(V)

is dehydrated and, if desired, a resulting salt is converted into the free compound or into another salt and/or a resulting compound is converted into an N-oxide or a quaternary ammonium compound thereof and/or a resulting compound on an N-oxide is converted into a salt thereof and/or a mixture of isomers is separated into the single isomers.

In the starting material of the Formula IV, the group $Ar_1$ may have one or more than one group $R_0$, which is converted into amino-lower alkoxy in one step or in stages. A particularly suitable group $R_0$ is hydroxyl. Its conversion into amino-lower alkoxy is carried out according to known procedures. Usually, the starting material, in which $Ar_0$ is substituted by hydroxy (the starting material, therefore, is a phenol), or preferably a salt thereof, is reacted with a reactive ester of an amino-lower alkanol, particularly a compound of the formula Am—($C_mH_{2m}$)—X, in which X stands for a reactive esterified hydroxy group. The latter is above all a hydroxy group esterified with a strong mineral acid, such as a hydrohalic acid, e.g. hydrochloric or hydrobromic acid. Accordingly the group X represents primarily halogeno, e.g. chloro or bromo. It may also be a hydroxy group esterified with a strong sulfonic acid, such as a lower alkane sulfonic acid, e.g. methane or ethane sulfonic acid or a monocyclic carbocyclic aryl-sulfonic acid, e.g. p-toluene sulfonic acid.

As noted above, the starting material is preferably used in the form of a salt thereof. Such salt, for example, a metal salt, particularly an alkali metal salt, e.g. lithium, sodium or potassium salt, as well as an alkaline earth metal salt, or another suitable salt, is formed, for example, by treatment of the phenol with a metal salt-forming reagent, such as an alkali metal hydride or amide, e.g. lithium hydride, sodium hydride, sodium amide or potassium amide or an alkali metal or alkaline earth metal lower alkoxide, e.g. lithium, sodium, potassium or barium methoxide, ethoxide or tertiary butoxide, an alkali metal compound of a hydrocarbon, e.g. butyl lithium, phenyl lithium or phenyl sodium. The preparation of the salts is usually carried out in the presence of an inert solvent, e.g. hexane, benzene, toluene, xylene, diethyl ether, p-dioxane, tetrahydrofuran, diethyleneglycol dimethylether or N,N-dimethylformamide or a lower alkanol, e.g. methanol or ethanol or a solvent mixture, if necessary, while cooling or at an elevated temperature, and/or in the atmosphere of an inert gas.

The reaction of the starting material, particularly in the form of a metal compound, with the reactive ester of an amino-lower alkanol is carried out in the presence of a suitable diluent, for example, in the solvent or solvent mixture used for the preparation of the metal compound, if necessary, while cooling or at an elevated temperature, and/or in the atmosphere of an inert gas, e.g. nitrogen. Formation of the metal compound of the starting material may also be achieved in situ; for example, the free starting material and the reactive ester of the amino-lower alkanol may be reacted in the presence of a salt-forming reagent, such as an alkali metal carbonate.

The conversion of a hydroxy group $R_0$ into the amino-lower alkoxy group may also be achieved by treating the starting material with an amino lower alkanol in the presence of a disubstituted carbonate. The latter is, for example, a diaryl carbonate, e.g. diphenyl carbonate or, more particularly, a di-lower alkyl carbonate, e.g. dimethyl carbonate, ethyl methyl carbonate, diethyl carbonate or dibutyl carbonate. The reaction is carried out at an elevated temperature, for example, between about 100° and about 210°, preferably between about 180° and about 200°, and, if desired, in the presence of a transesterification catalyst enhancing the rate of the reaction, e.g. sodium, potassium, sodium carbonate, potassium carbonate or sodium aluminate, a metal lower alkoxide, e.g. sodium ethoxide or titanium butoxide. The reaction is usually performed in the absence of an additional diluent, but may also be carried out in the presence of a further solvent or solvent mixture, if necessary, in a closed vessel and/or in the atmosphere of an inert gas, e.g. nitrogen.

Another group $R_0$ is that of the formula $$-O-C(=O)-Y$$

in which Y represents halogeno or etherified hydroxy. The group Y is particularly lower alkoxy, e.g. methoxy, ethoxy or n-butoxy, as well as phenoxy, whereas halogeno, representing Y, is particularly chloro, as well as bromo. Upon reacting a starting material of the Formula IV, in which Ar is substituted by such group $R_0$, with an amino-lower alkanol, the desired compound can also be formed. The reaction is carried out under the last mentioned conditions, i.e. at an elevated temperature, preferably between 180° and 200°, and, if desired, in the presence of a transesterification reagent, such as one of those previously-described; the reaction may be carried out in the presence of a solvent or solvent mixture, if necessary, in the atmosphere of an inert gas, e.g. nitrogen.

A further group $R_o$ is a reactive esterified hydroxy-lower alkoxy group, particularly that of the formula —O—$(C_mH_{2m})$—X. Here the reactive esterified hydroxy group X is primarily halogeno, particularly chloro; it may also be an organic sulfonyloxy group, such as one of those mentioned above.

A starting material of the Formula IV in which $R_o$ stands for reactive esterified hydroxy-lower alkoxy is reacted with ammonia or a primary or secondary amine, preferably those of the formula H—Am, to yield the desired compounds. The reaction is preferably carried out in such manner, that an excess of the ammonia or amine or of any other suitable base is present to neutralize the generated acid. A base, acting as acid-neutralizing agent, is for example, potassium carbonate. If desired, the reaction mixture is diluted with a suitable solvent or solvent mixture; if necessary, the reaction is carried out while cooling or at an elevated temperature, and/or in the atmosphere of an inert gas, e.g. nitrogen, and/or in a closed vessel.

In the starting material of the Formula V the hydroxy group is preferably attached to the same carbon atom as the group Ar, especially if the latter substitutes one of the carbon atoms adjacent to the 1,2-phenylene radical. It may also be attached to the carbon atom carrying the group R, as well as to a branched carbon atom of the lower alkylene portion —$(C_nH_{2n-3})$—. The dehydration is achieved, for example, by pyrolysis or advantageously by treatment with a dehydrating reagent, especially an acidic dehydrating agent, such as an inorganic acid, e.g. hydrochloric, hydrobromic, hydriodic or sulfuric acid, an inorganic acid halide, such as thionyl chloride or phosphorus chloride, or any other suitable inorganic acidic reagent, such as ammonium chloride, as well as an organic acid, such as p-toluene sulfonic acid, an organic acid halide, such as acetic acid chloride or p-toluene sulfonyl chloride, an organic acid anhydride, such as acetic acid anhydride or propionic acid anhydride or any other suitable organic acidic dehydrating reagent, such as pyridine hydrochloride. If necessary, the reaction is carried out in the presence of a suitable diluent, preferably at an elevated temperature, in a closed vesel, and/or in the atmosphere of an inert gas, e.g. nitrogen.

The final products are obtained in free form or in the form of their salts, depending on the conditions under which the process is carried out. A resulting salt is converted into the free base, for example, by treating it with an alkaline reagent, such as a metal hydroxide, e.g. lithium, sodium, potassium or calcium hydroxide, a metal carbonate, e.g. sodium, potassium or calcium carbonate or hydrogen carbonate, ammonia, or by treatment with a suitable hydroxyl ion exchange resin.

A resulting salt, particularly a salt with an inorganic acid, can be converted into another salt according to known methods, for example, by reacting it with a suitable metal, e.g. sodium, barium or silver salt of an acid, preferably in the presence of a diluent, in which a resulting inorganic salt is insoluble and is thus removed from the reaction mixture. A salt may also be converted into another salt by treating it with an anion exchange resin.

A free base is converted into an acid addition salt thereof according to known methods, for example, by reacting it or a solution thereof in a suitable solvent or solvent mixture, with the acid or a solution thereof, or with a suitable anion exchange resin and isolating the desired salt. A salt may be obtained in the form of a hydrate thereof or may include solvent of crystallization.

An N-oxide of the compounds of this invention is prepared according to known methods, for example, by treating the free base with a suitable N-oxidizing reagent, such as hydrogen peroxide, ozone or a peracid, e.g. peracetic, perbenzoic, monoperphthalic or persulfuric acid, in the presence of a suitable inert diluent. An N-oxide can be converted into a salt thereof according to the above procedure.

Quaternary ammonium derivatives of the compounds of this invention are obtained according to known methods, for example, by reacting the base with the reactive ester of an alcohol and a strong acid, such as, for example, with one of the lower alkyl halides, di-lower alkyl-sulfates, lower alkyl organic sulfonates or phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen.

Resulting quaternary amomnium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange resin or by electrodialysis. A quaternary ammonium hydroxide is converted into a quaternary ammonium salt by reacting the former with a suitable acid. A quaternary ammonium salt can also be converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange resin, can be converted into another quaternary ammonium salt. A quaternary ammonium compound may be obtained in the form of a hydrate thereof or may contain solvent of crystallization.

A mixture of resulting isomeric compounds may be separated into the single isomers. For example, a mixture of diastereoisomers or a mixture of geometric cis-trans isomers is separated into the individual racemic compounds on the basis of physico-chemical differences, such as solubility, for example, by fractional crystallization, as well as by fractional distillation. Racemates are resolved into the optically active d- and l- forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric and L-tartaric acid, as well as the optically active forms of malic, mandelic, camphor 10-sulfonic or quinic acid. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide or quaternary ammonium compound according to the procedures described above.

The invention also comprises any modification of the process wherein a compound formed as an intermediate at any stage of the process, is used as starting material and the remaining step(s) of the process is (are) carried out, or the process is discontinued at any stage thereof, or the starting materials are formed under the reaction conditions, or the reaction components are used in the form of their salts. The invention further comprises any new intermediates and new starting materials.

In the process of this invention such starting materials are preferably used which lead to final products mentioned in the beginning as preferred embodiments of the invention.

The starting materials are known or, if new, may be prepared by methods in themselves known.

The starting material of the Formula IV, in which $Ar_1$ is a monocyclic carbocyclic aryl radical substituted by hydroxy, is obtained, for example, by reacting corresponding compounds of the formulae

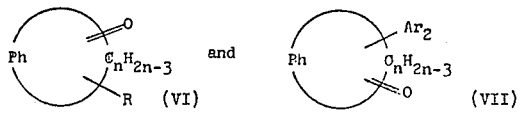

with a Grignard compound Hal-Mg-Ar$_2$ or Hal-Mg-R respectively in which Ar$_2$ is a monocyclic carbocyclic aryl radical substituted by a group capable of being converted into a hydroxy group, particularly lower alkoxy, e.g. methoxy or ethoxy as well as benzyloxy group, e.g. benzyloxy or 1-phenyl-ethoxy. A resulting compound of the formula

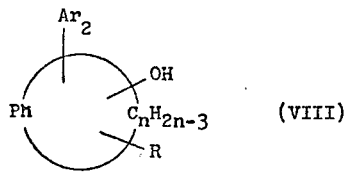

can be dehydrated as shown above and the substituent which is capable of being converted into a hydroxy group, is so converted, for example, by acid hydrolysis with an aqueous hydrohalic acid, e.g. hydrobromic acid. In the resulting phenol the hydroxy group may be converted into the group —O—C(=O)—Y, for example, according to any method suitable for the esterification of a phenolic hydroxyl group, such as formation of an alkali metal compound of the phenolic intermediate and reaction of the latter with an ester of the acid of the formula

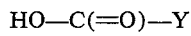

HO—C(=O)—Y or the halide thereof.

In addition, in a resulting starting material of the Formula IV, wherever R$_o$ represents hydroxyl, R$_o$ may be converted into an esterified hydroxy-lower alkoxy group by treating the phenol or a salt thereof with a lower alkylene-oxide, a halogeno lower alkanol or a lower alkylene halide, in which the two halogen atoms or the halogen atom and hydroxyl group respectively, are separated by at least two carbon atoms, for example, a chloro- or hydroxy-lower alkyl bromide, and if necessary, converting in a resulting compound in which Ar$_1$ is substituted by a hydroxy-lower alkoxy substituent, the hydroxy group of such substituent into an esterified hydroxy group, for example, by treatment with a thionyl halide, e.g. thionyl chloride, a phosphorus halide, e.g. phosphorus tribromide, or with an organic sulfonic acid halide, e.g. the chloride, in the presence of a suitable base, e.g. pyridine.

The starting materials of the Formula V are also prepared according to known methods, for example, by reacting compounds of the formulae

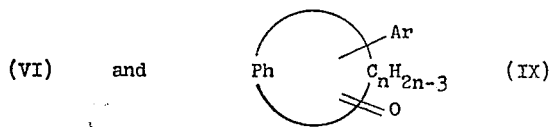

with a Grignard compound Hal-Mg-Ar or Hal-Mg-R respectively and carefully decomposing the resulting metallic complex.

The intermediates used in the above described Grignard reactions for the preparation of the starting materials are known or may be prepared according to known methods; the Grignard reagent may be prepared, for example, according to the "Method of Entrainment," described by Kharash and Reinmuth, Grignard Reactions of Non-metallic Substances (Prentice Hall, 1954).

The hydroxy group in Formula VIII usually substitutes the carbon atom carrying the group Ar$_2$, but may also be attached to the carbon atom carrying the group R. Removal of water by dehydration is achieved, for example, by heating the hydroxy compound, or more preferably, by its treatment with a dehydrating reagent, especially an acidic dehydrating agent, such as that shown above.

The compounds of this invention are useful in the form of compositions suitable for enteral, e.g. oral, parenteral or topical use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets or dragées, in liquid form, for example, as solutions or suspensions or in the form of emulsions, e.g. salves or creams. Suitable carrier materials, are, for example, starches, e.g. corn wheat or rice starch, sugars, e.g. lactose, glucose or sucrose, stearic acid or salts thereof, e.g. magnesium stearate or calcium stearate stearyl alcohol, talc, gums, acacia, tragacanth, propylene glycol or polyalkylene glycols. The quantity and the nature of the carrier ingredients can vary widely and depend, inter alia, upon the desired physical appearance or size of the composition or method of manufacture. Encapsulation may be effected by using, if desired, the same excipients as those used for tablets. If necessary, the compositions having as the effective pharmacological ingredient one of the compounds of this invention, may contain other auxiliary substances, such as preserving, stabilizing, wetting or emulsifying agents, salts for varying the osmotic pressure of buffers. They may also contain, in combination, other pharmacologically useful substances. The compounding of the formulations is generally carried out in the manner normally employed in the art, i.e. by manufacturing a mixture or a granulate. Any compatible color, approved and certified under the provisions of the Federal Food, Drug and Cosmetic Law may be used for aesthetic purposes or as a means of identification.

The compounds of the invention may also be used in the form of veterinary compositions, such as those shown above or in feedingstuffs or additives for feedingstuffs or drinking water. Such preparations are formulated according to methods known in the art.

The following examples illustrate the invention, temperatures are given in degrees centigrade and all parts wherever given are parts by weight.

EXAMPLE 1

To a solution of 2.7 g. 1,2-bis-(4-hydroxy-phenyl)-3,4-dihydro-naphthalene in 10 ml. dimethylformamide is added in portions 0.825 g. of a 53% suspension of sodium hydride while stirring and cooling in an ice bath. After the evolution of hydrogen ceases, 10.4 ml. of a toluene solution containing 2.33 g. 2-diethylaminoethyl chloride is added; stirring is continued for three hours at room temperature. After standing overnight, the solid material is filtered off, the filtrate is evaporated to a small volume and diluted with water. The oily mixture is extracted three times with diethyl ether; the organic solution is washed with 2 N aqueous hydrochloric acid, and the aqueous washings are made basic (pH=8) with solid sodium carbonate. The organic material is extracted with diethyl ether and the organic solution is dried over sodium sulfate and evaporated to yield 2.8 g. of a red oil which is chromatographed on 90.0 g. of aluminum oxide (neutral) containing 5% of water. A solution of the red oil in a 1:1-mixture of benzene and hexane is placed on the column, which is developed as follows taking 25 ml. fractions:

| Solvent | Amount (ml.) | Fractions |
|---|---|---|
| 1:1-mixture of benzene and hexane | 275 | 1–11 |
| Benzene | 200 | 12–19 |
| Benzene containing 20 percent of diethyl ether | 225 | 20–28 |
| Benzene containing 50 percent of diethyl ether | 150 | 29–34 |
| Diethyl ether | 75 | 35–37 |
| Ethyl acetate | 25 | 38 |

Fractions 15–22 are combined and yield 1.8 g. of the oily 1,2 - bis - [4 - (2 - diethylaminoethoxy) - phenyl] - 3,4-dihydro-naphthalene of the formula

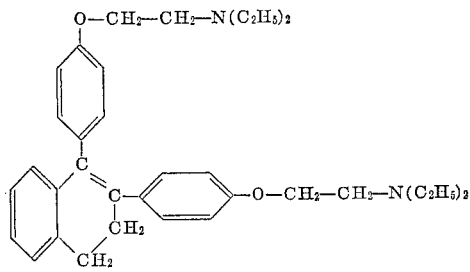

The starting material used in the above reaction is prepared as follows: To a solution of 30.0 g. 4-bromo-anisole in 75 ml. diethyl ether is added 3.84 g. magnesium in 75 ml. diethyl ether; the reaction is initiated with a small amount of methyl iodide. The mixture is refluxed for one hour, cooled in an ice-bath and treated with 20.2 g. 2-(4-methoxy-phenyl)1,2,3,4 - tetrahydro - naphthalen - 1 - one in 150 ml. benzene. After refluxing for seven hours, it is poured into a saturated aqueous solution of ammonium chloride and extracted three times with diethyl ether. The organic solution is dried over sodium sulfate and the orange oil remaining after evaporating the solvent is taken up in 100 ml. concentrated hydrochloric acid; the mixture is refluxed for thirty minutes and diluted with water. The precipitate is collected and yields the 1,2-bis-(4-methoxy-phenyl)-3,4-dihydro-naphthalene, which melts at 167–168° after recrystallization from ethanol; yield: 18.4 g.

A solution of 60 ml. pyridine in 75 ml. concentrated hydrochloric acid is distilled until the vapors reach a temperature of over 200° (bath temperature: 260°). A total of 5.0 g. 1,2-bis-(4-methoxy-phenyl)3,4-dihydro-naphthalene is added to the melt of pyridine hydrochloride, and the mixture is refluxed for one hour (bath temperature: about 250°). After cooling, water is added, the organic material is extracted with ethyl acetate, and the organic extracts are washed with a saturated aqueous solution of sodium chloride and dried over sodium sulfate. The solvent is then evaporated, and the remaining solid 1,2-bis-(4-hydroxy-phenyl)-3,4-dihydro-naphthalene is recrystallized from a mixture of ethyl acetate and pentane, M.P. 255–258°.

EXAMPLE 2

To a solution of 3.36 g. 1-(4-hydroxy-phenyl)-2-(3-pyridyl)-3,4-dihydro-naphthalene in 25 ml. dimethylformamide is treated with 0.56 g. of a 53% sodium hydride suspension in mineral oil at room temperature, and subsequently with 1.15 g. 2-diethyl-aminoethyl chloride in 8 ml. toluene while stirring. The reaction mixture is allowed to stand at room temperature for fifteen hours, the inorganic precipitate is filtered off and the filtrate is concentrated to a volume of about 10 ml. under reduced pressure and diluted with water. The organic material is extracted with ethyl acetate. The organic extract is washed twice with 2 N aqueous hydrochloric acid, the acid extracts are adjusted to pH 7 with 40% aqueous sodium hydroxide and an aqueous solution of sodium hydrogen carbonate, and the organic material is extracted five times with a 5:1-mixture of diethyl ether and ethyl acetate. The organic solution is washed with a saturated aqueous solution of sodium chloride, dried over sodium sulfate and evaporated to yield 4.2 g. of the oily 1-[4-(2-diethylaminoethoxy)-phenyl] - 2 - (3-pyridyl) - 3,4 - dihydro-napthalene of the formula

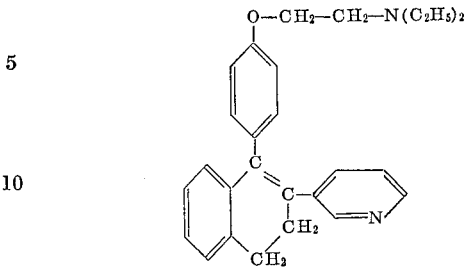

which is purified by distillation, B.P. 195–200°/0.05 mm.

The starting material used in the above reaction may be prepared as follows: To an ice-bath cooled solution of 25.7 g. 3-pyridyl-acetonitrile in 150 ml. dimethylformamide is added in small portions 10.49 g. of a 53% suspension of sodium hydride in mineral oil while stirring. The mixture is agitated at room temperature until hydrogen evolution ceases and is then again cooled in an ice-bath. A solution of 40.2 g. 2-bromoethyl-benzene in 150 ml. toluene is added in a slow stream; the resulting mixture is stirred for three hours at room temperature and then allowed to stand overnight at room temperature. The inorganic material is filtered off, the filtrate is evaporated to a total volume of 100 ml. and diluted with water. The organic material is extracted with three portions of diethyl ether, the organic solutions are washed with a saturated aqueous sodium chloride solution, dried over sodium sulfate, filtered and evaporated to dryness. The residue is distilled to yield 30.8 g. of a yellow oil representing 4-phenyl - 2 - (3-pyridyl) - butyronitrile; B.P. 143–150°/0.01 mm.

To a solution of 15.0 g. thereof in 60 ml. 95% aqueous ethanol is added a solution of 30 g. sodium hydroxide in 30 ml. water, and the mixture is refluxed for 64 hours. The organic solvent is evaporated under reduced pressure, more water is added and the pH is adjusted to 5 with 2 N aqueous hydrochloric acid and aqueous acetic acid. The mixture is extracted three times with diethyl ether; the organic extracts are washed with a saturated aqueous sodium chloride solution, dried over sodium sulfate and evaporated to dryness. The acetic acid remaining in the residue is driven off by blowing air over the surface of the oily product; 14.0 g. 4-phenyl-2-(3-pyridyl)-butyric acid is recovered; the product melts at 106–108° and is recrystallized from a mixture of ethanol and water, M.P. 110–112.5°.

11 g. thereof are stirred into 55 g. polyphosphoric acid, preheated to 90°. The temperature is elevated to 105–110° and maintained at that level for 25 minutes. The resulting clear solution is stirred into ice-water, the mixture is neutralized with 50% aqueous sodium hydroxide while keeping the temperature below 40°. The pH is adjusted to 8 by adding sodium carbonate, and the resulting crystalline precipitate is filtered off and taken up in diethyl ether. The organic solution is washed with water and saturated aqueous sodium chloride solution, dried over sodium sulfate, filtered and evaporated to dryness to yield 9.3 g. of the colorless crystalline 2-(3-pyridyl)-1,2,3,4-tetrahydronaphthalen-1-one. The compound is purified by recrystallization from a mixture of ethanol and water, M.P. 79–80°; the infrared absorption spectrum shows the characteristic conjugated carbonyl band at 1688 cm.$^{-1}$.

To a Grignard reagent prepared from 2.43 g. magnesium and 18.7 4-bromo-anisole in 50 ml. of diethyl ether is added dropwise a solution of 15.0 g. 2-(3-pyridyl)-1,2,3,4-tetrahydronaphthalen-1-one in 50 ml. benzene. The reaction mixture is refluxed for one hour, is allowed to stand at room temperature for eighteen hours and is refluxed for one additional hour. The reaction mixture is cooled, water is added dropwise and then a saturated solution of ammonium chloride in water while stirring. The crystalline precipitate floating between the organic and aqueous layers is collected and recrystallized from 95% ethanol to yield 5.0 g. of the 1-hydroxy-1-(4-methoxy-phenyl)-2-(3-pyridyl) - 1,2,3,4 - tetrahydro - naphthalene, M.P. 198–199°.

A mixture of 5.0 g. thereof in 50 ml. concentrated hydrochloric acid is refluxed for one hour and is then made alkaline to pH=8 by adding a 40 percent aqueous solution of sodium hydroxide. The organic material is extracted twice with ethyl acetate. The combined extracts are washed with a saturated aqueous solution of sodium chloride, dried over sodium sulfate and evaporated to dryness to yield 4.5 g. of 1-(4-methoxy-phenyl)-2-(3-pyridyl)-3,4-dihydro-naphthalene, which melts at 130–131° after recrystallization from a 1:1 mixture of ethanol and water.

A mixture of 4.4 g. thereof and pyridine hydrochloride (prepared from 50 g. of pyridine and 60 ml. of concentrated hydrochloric acid) is refluxed for thirty minutes (bath temperature: 250°). After cooling, the mixture is diluted with water, the pH is adjusted to 5 with sodium hydrogen carbonate and sodium acetate. The desired 1-(4-hydroxy-phenyl)-2-(3-pyridyl) - 3,4-dihydro-naphthalene precipitates, is collected, washed, air-dried and recrystallized from a mixture of N,N-dimethylformamide and water, M.P. 300–302°.

The above procedure is a specific example of a generally applicable method for the preparation of the intermediates and the starting materials used for the manufacture of the compounds of this invention.

EXAMPLE 3

To the mixture of 2.5 g. 1-(4-hydroxy-phenyl)-2-phenyl-3,4-dihydro-naphthalene, 1.5 g. 2-chloromethyl-imidazoline hydrochloride, 25 ml. dimethylformamide and 25 ml. toluene, 0.95 g. of a 53% suspension of sodium hydride in mineral oil are added in portions while stirring. The mixture is stirred for 24 hours at room temperature and then evaporated in vacuo. The residue is suspended in water and the mixture 3 times extracted with ethyl acetate. The extract is washed with water, dried and evaporated. The so-obtained 1 - [4 - (2 - imidazolinyl-methoxy)-phenyl]-2-phenyl-3,4-dihydro-naphthalene of the formula

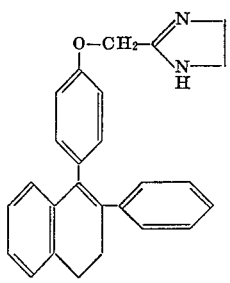

is recrystallized first from benzene-petroleum ether and then from aqueous ethanol; M.P. 165–166°.

EXAMPLE 4

To the mixture of 3.0 g. 1-phenyl-2-(4-hydroxy-phenyl)-3,4-dihydro-naphthalene, 1.36 g. 2-chloro-ethyl-N,N-diethylamine, 35 ml. dimethylformamide and 35 ml. toluene, 0.48 g. of a 53% suspension of sodium hydride in mineral oil are added in portions while stirring. The mixture is stirred for 24 hours, at room temperature and then evaporated in vacuo. The residue is suspended in water, the suspension extracted 3 times with ethyl acetate, the extract washed with water, dried and evaporated. The residue is dissolved in 95% ethanol and hydrogen chloride is bubbled into this solution for a few minutes, which is then refluxed for three hours. The crystalline hydrochloride of the 1-phenyl-2-[4-(2-diethylamino-ethoxy)-phenyl]-3,4-dihydronaphthalene having the formula

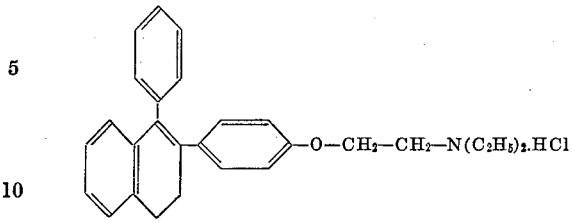

is recrystallized from acetone, M.P. 173–174°.

EXAMPLE 5

According to the method applied in Example 4, the 1-[4-(2-diethylamino-ethoxy)-phenyl] - 2 - (3-pyridyl)-7-chloro-3,4-dihydro-naphthalene of the formula

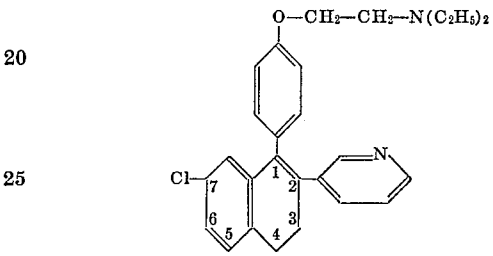

is obtained from 3.5 g. 1-(4-hydroxy-phenyl)-2-(3-pyridyl)-7-chloro-3,4-dihydro-naphthalene, 1.42 g. 2-chloro-ethyl-N,N-diethylamine and 0.5 g. 53% sodium hydride suspension. It melts after chromatography of its benzene solution on alumina (neutral, activity III) and elution with benzene and diethyl ether-benzene 1:4 at 76–77°.

What is claimed is:

1. A member selected from the group consisting of the compound having the formula

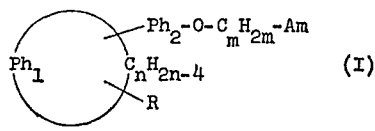

in which $Ph_1$ stands for 1,2-phenylene, (lower alkyl)-1,2-phenylene, (lower alkoxy)-1,2-phenylene, (halogeno)-1,2-phenylene, or (trifluoromethyl)-1,2-phenylene, $Ph_2$ is phenylene, (lower alkyl)-phenylene, (halogeno)-phenylene or (trifluoromethyl)-phenylene, Am is di-lower alkylamino, 2-imidazolinyl or 1-lower alkyl-2-imidazolinyl, $C_mH_{2m}$ is lower alkylene separating two hetero atoms by at least two carbon atoms, R is pyridyl or (lower alkyl)-pyridyl and the portion —$C_mH_{2n-4}$— is lower alkenylene forming with Ph a six-membered ring, two of the ring-carbon atoms thereof carry the $Ph_2$ and R-radicals, a lower alkyl quaternary and an acid addition salt thereof.

2. A member selected from the group consisting of the compound having the formula

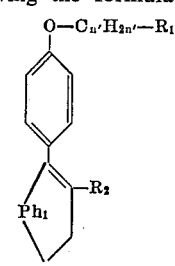

in which $Ph_1$ stands for a member selected from the group consisting of 1,2-phenylene and (halogeno)-1,2-phenylene, $R_1$ for 2-imidazolinyl $n'$ for the integer 1 and $R_2$ for 3-pyridyl, and an acid addition salt thereof.

3. A member selected from the group consisting of the compound having the formula shown in claim 2, in which $Ph_1$ stands for a member selected from the group consisting of 1,2-phenylene, and (halogeno)-1,2-phenylene, $R_1$ for di-lower-alkylamino, $n'$ for an integer from 2 to 3 whereby the nitrogen atom is separated from the oxygen atom on the 1-phenyl group by at least 2 carbon atoms and $R_2$ for 3-pyridyl and an acid addition salt thereof.

4. A member selected from the group consisting of 1 - [4 - (2 - diethylaminoethoxy) - phenyl] - 2 - (3 - pyridyl)-3,4-dihydronaphthalene and acid addition salts thereof.

5. A member selected from the group consisting of 1 - [4 - (2 - diethylaminoethoxy) - phenyl] - 2 - (3 - pyridyl)-7-chloro-3,4-dihydro-naphthalene and acid addition salts thereof.

References Cited

UNITED STATES PATENTS 3,238,218  3/1966  Bencze _____ 260—296

HENRY R. JILES, *Primary Examiner.*

A. L. ROTMAN, *Assistant Examiner.*

U.S. Cl. X.R.

260—247.7, 268, 309.6, 570.7, 619; 99—2; 424—263, 273, 330